Aug. 25, 1931. J. K. B. RAEDER 1,820,248
GLASS MAKING FURNACE AND METHOD
Filed Sept. 25, 1928 3 Sheets-Sheet 1
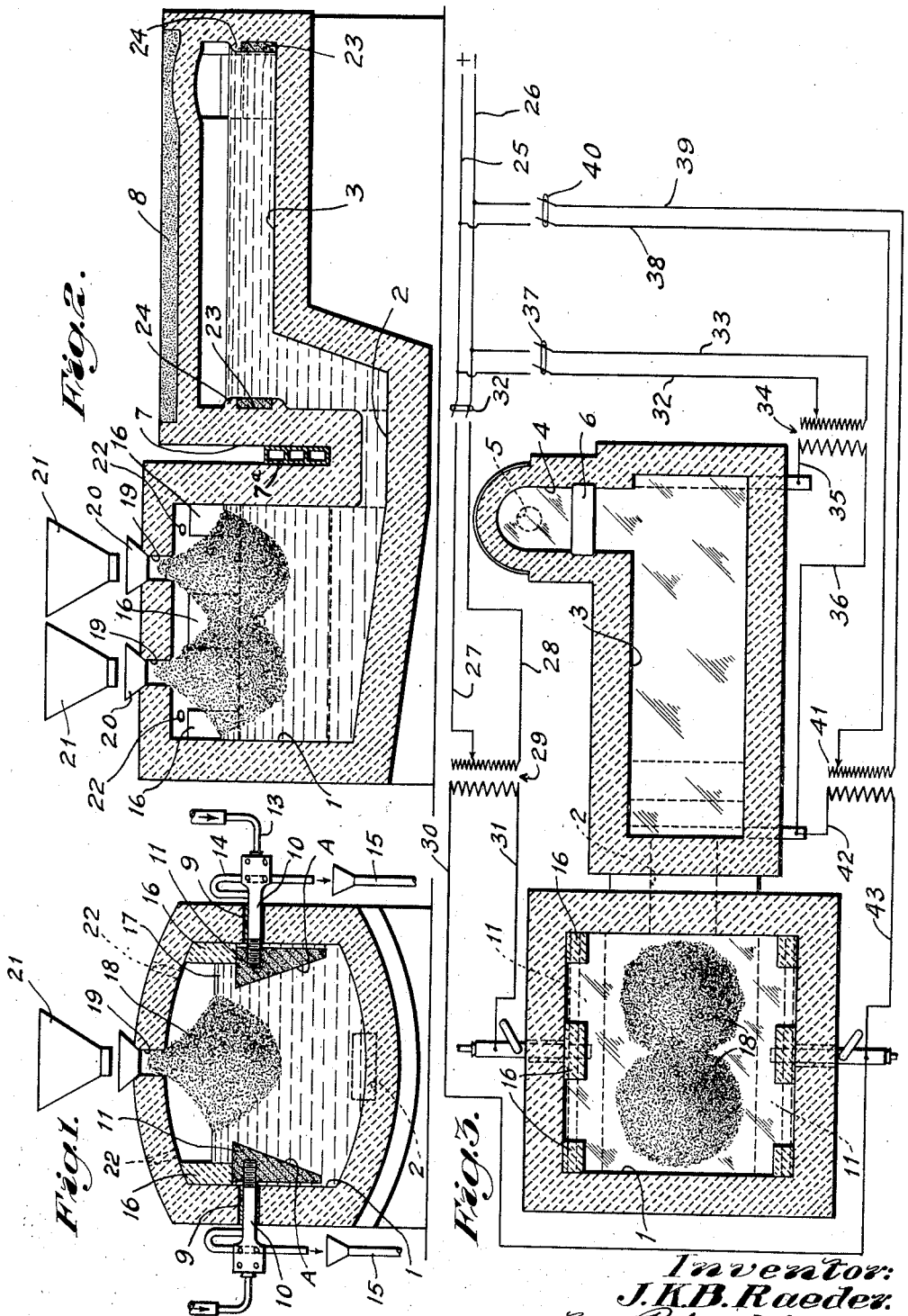
Inventor:
J.K.B. Raeder.
by Robson D Brown
Attorney

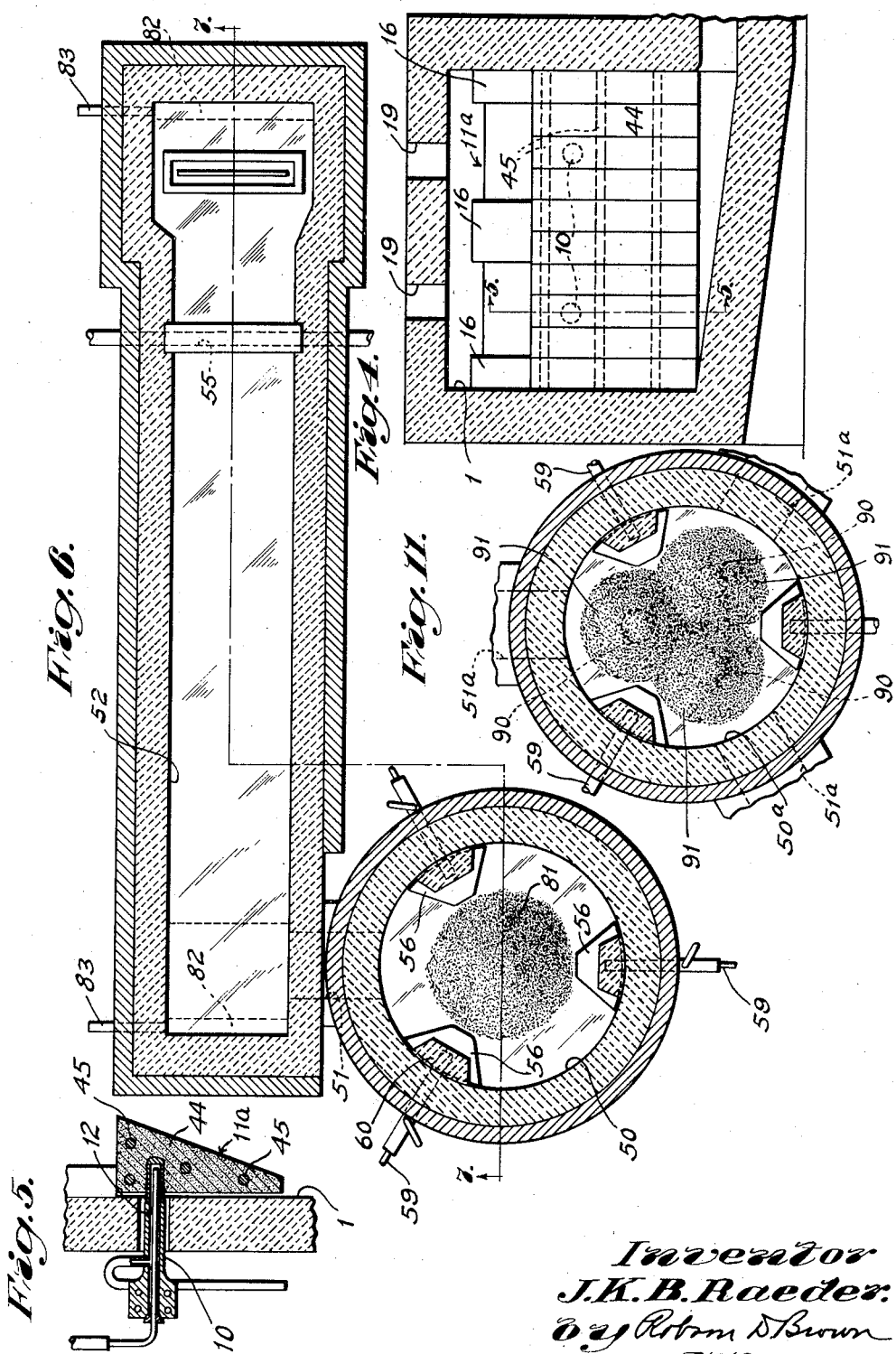

Aug. 25, 1931.　　　J. K. B. RAEDER　　　1,820,248
GLASS MAKING FURNACE AND METHOD
Filed Sept. 25, 1928　　　3 Sheets-Sheet 3
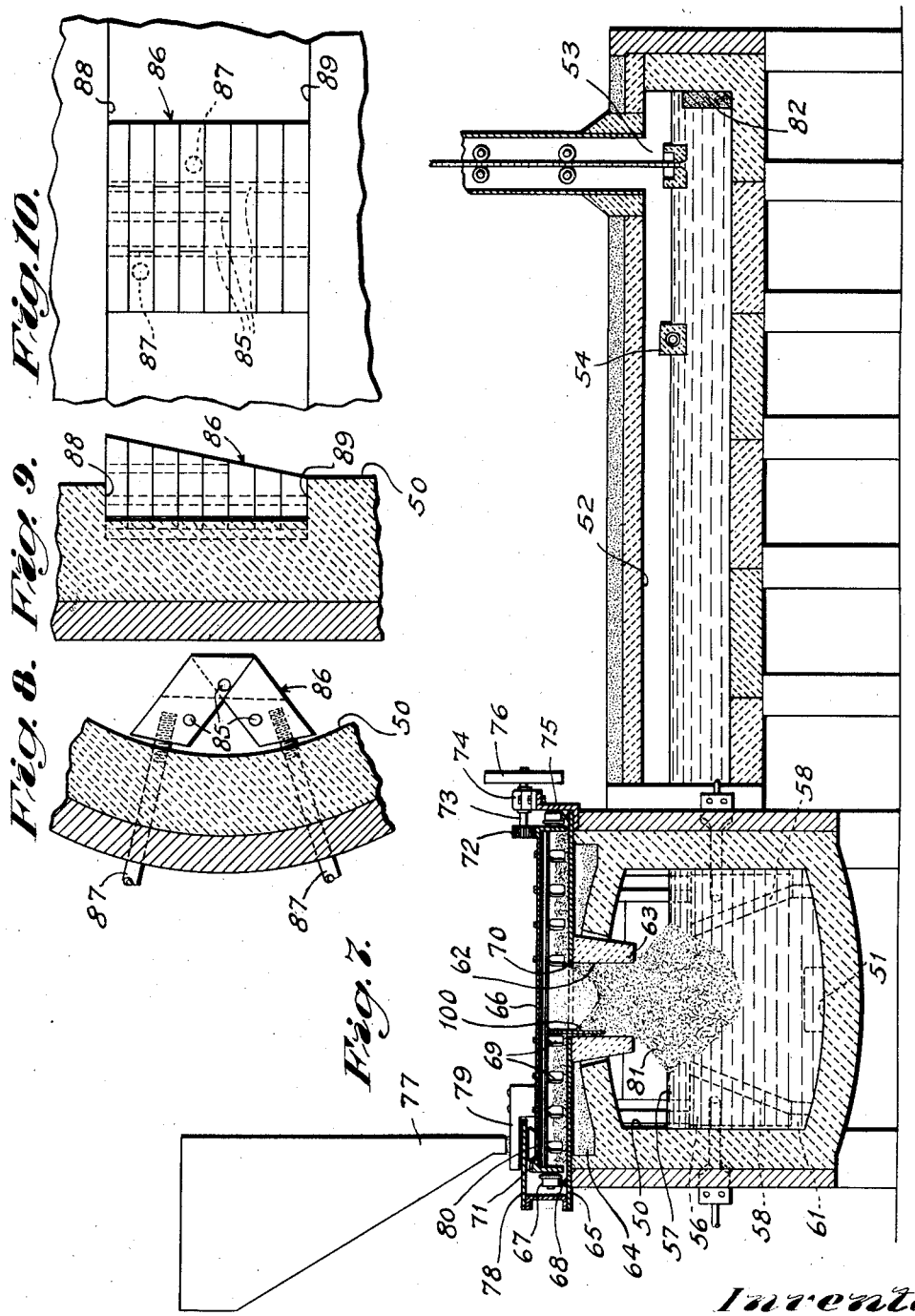

Patented Aug. 25, 1931

1,820,248

UNITED STATES PATENT OFFICE

JOHN KRISTOFFER BJÖRN RAEDER, OF HOLMENKOLLEN, NEAR OSLO, NORWAY, ASSIGNOR, BY MESNE ASSIGNMENTS, TO HARTFORD-EMPIRE COMPANY, OF HARTFORD, CONNECTICUT, A CORPORATION OF DELAWARE

GLASS MAKING FURNACE AND METHOD

Application filed September 25, 1928, Serial No. 308,196, and in Norway May 19, 1928.

My invention relates generally to electric resistance furnaces and more particularly to electric resistance furnaces for the melting of glass in which molten glass serves as a resistance to the flow of electric current, and to methods involving the use of electric resistance furnace of the type described.

An object of the invention is to provide an improved electric resistance furnace in which glass can be melted, refined and conditioned in an efficient, economical and commercially practical manner.

A further object of the invention is to provide for heating glass in an electric resistance furnace adequately and uniformly without causing harmful heating of the electrodes of the furnace or such reaction between the electrodes and the glass as would cause discoloration or impairment of the quality of the glass or tend to objectionably limit the duration of effective service of the electrodes.

Other objects of the invention are to improve means for and methods of passing an electric current through molten glass in a resistance furnace, protecting the electrodes against oxidation and against the harmful influences of chemical, mechanical, and thermal forces within the furnace, and feeding glass making materials to the molten glass in the furnace.

A still further object of the invention is to provide efficient, durable, and conveniently applicable electrodes for use in an electric resistance furnace.

Certain features of the invention disclosed herein, when construed broadly, are disclosed also in my copending application, Serial No. 56,301, filed September 14, 1925, for an electric furnace for glass melting, and the present application therefore is a continuation in part of such prior copending application.

A furnace embodying structural features of the invention and adapted for use in carrying out methods contemplated by the invention may provide for the melting of glass making materials and for refining of the glass electrothermally in the same chamber. For economy in the use of the heat generated by the passage of electric current through the molten glass and in the space required for the melting and refining of a given volume of glass, the refining of the glass may be effected below the zone at which the glass making materials are melted. In other words, melting and refining of the glass may be accomplished in a vertical chamber or shaft in which the molten glass moves downward from the melting zone into a refining zone and the melting and refining of the glass may be accomplished by heat which results from the passage through the glass of the same electric current.

Spaced electrodes wholly submerged in the molten glass may depend from the melting zone into the refining zone and the refined glass preferably is conducted from the melting and refining chamber at a level below the lower edges of the electrodes. The electrodes preferably are spaced sufficiently far above the bottom wall of the melting and refining chamber to prevent such bottom wall from being subjected to excessive heat or wear. Glass from the refining zone may pass, in the manner described, into a conditioning chamber in which a further refining of the glass may be effected. The glass preferably may flow horizontally in the conditioning chamber for a sufficient distance to permit any required cooling of the glass and so that a relatively large surface is provided for the escape of any bubbles or gases which may remain in the glass.

The feeding of the glass making materials to the molten glass in the melting and refining chamber is accomplished in such manner that the glass making materials accumulate in a heap or heaps, each of which has a portion of considerable extent forced downward below the surface of the molten glass well into the melting zone, while the remainder of the heap extends above the surface of the molten glass and engages with suitable means, such as the wall of a feed opening or a member depending therefrom so that the batch heap is maintained against substantial horizontal floating movement in the molten glass. Provision is made for the feeding of the molten glass so that the batch heap or heaps will not prevent the escape of bubbles and gases from the molten glass in the melting and refining chamber.

The electrodes are spaced from each other and preferably the size and shape of such electrodes are so predetermined that the surfaces thereof in electrical conductive contact with the molten glass have an area not appreciably less than that of the cross-section of the intervening body of molten glass. The electrodes are spaced also from the walls of the melting and refining chamber by a protective layer of molten glass to obviate oxidation of the electrodes by air permeating the walls of the melting and refining chamber. Such electrodes preferably are of carbon or graphite and have terminals of relatively small section extending through openings in the furnace walls, such terminals being spaced from the walls of the openings by protective layers of molten glass or other protective material and preferably being locally cooled. The terminals may be of iron or other suitable metal or of the same material as the electrodes.

The batch making materials preferably are preheated so that they will be relatively dry when delivered into the melting and refining chamber and thus will readily form a batch heap that will be partly submerged in the molten glass. The batch heap will be sufficiently remote from the contact faces of the electrodes to prevent any harmful reaction between the electrodes and partly melted batch or alkalis which may be set free during the melting of the batch and also to prevent over-heating of the electrodes during the melting of the batch. The portion of the batch heap in the path of the electric current will have a much higher specific resistance to the flow of electric current than the molten glass in the melting and refining chamber, and consequently will serve to increase the resistance to the flow of electric current between the upper portions of the electrodes and also to reduce the effective cross-sectional area in a vertical plane of the glass between the electrodes. Consequently, a zone of relatively intense generated heat will be provided next to the batch heap and relatively more heat will be developed at the place where such heat is to be consumed in the melting of the batch than at other places between the electrodes. The opposite faces of the electrodes may be shaped with relation to each other so as to increase the total resistance to the flow of current between different portions thereof as the specific resistance of the intervening material decreases.

In the drawings, Figure 1 is a transverse vertical section through the melting and refining portion of one form of glass resistance furnace embodying structural features of the invention;

Fig. 2 is a longitudinal vertical section through the furnace;

Fig. 3 is a horizontal section through the furnace, showing also in a somewhat diagrammatic manner electric conducting means for supplying current to the electrodes of the furnace;

Fig. 4 is a longitudinal vertical section through the melting and refining chamber of the resistance furnace as it appears when equipped with electrodes of a modified form of construction;

Fig. 5 is a fragmentary vertical sectional view substantially along the line 5—5 of Fig. 4;

Fig. 6 is a horizontal sectional view of another form of electric resistance furnace embodying structural features of the invention and adapted for the use of polyphase current;

Fig. 7 is a vertical section substantially along the line 7—7 of Fig. 6;

Fig. 8 is a fragmentary horizontal sectional view of a portion of a melting and refining chamber similar to that shown in Figs. 6 and 7, but equipped with a modified form of electrode;

Fig. 9 is a side elevation of the fragmentary structure shown in Fig. 8;

Fig. 10 is a face view of the fragmentary structure of Figs. 8 and 9 as viewed from the right of Fig. 9; and Fig. 11 is a horizontal sectional view of a glass melting and refining chamber similar to that shown in Figs. 6 and 7, but adapted for the feeding of glass making materials in three symmetrically distributed heaps instead of in a single heap as shown in Figs. 6 and 7.

The glass melting furnace shown in Figs. 1 to 3 inclusive may comprise a melting and refining chamber 1 having communication at its bottom through a passage 2 with a conditioning chamber 3. The conditioning chamber 3 may be provided at its end remote from the passage 2 with a laterally extending forehearth 4 with which any suitable glass feeding means may be associated. The forehearth 4 is shown as having a discharge outlet 5 in its bottom. A gate 6 may be provided to regulate the flow of glass from the conditioning chamber 3 into the forehearth.

The walls of the melting and refining chamber 1, the conditioning chamber 3, the connecting passage 2 and the forehearth 4 may be made of any suitable known refractory materials. A cooling space 7 may be provided above the passage 2 between the adjacent walls of the melting and refining chamber and the conditioning chamber and may be water-cooled, as by the pipes 7ª, Fig. 2. The refractory walls of the furnace may be suitably insulated as by insulating material such as indicated at 8 in Fig. 2 and may be reinforced, and supported in any suitable known manner.

The side walls of the melting and refining chamber 1 are shown in Figs. 1 and 2 as being provided with aligned openings 9 through which the terminals 10 of a pair of oppositely disposed electrodes 11 extend. The openings 9 preferably are somewhat larger in cross-sectional area than the terminals 10 and a suitable sealing material is provided between each terminal 10 and the walls of the opening through which the terminal extends to prevent the leakage of air through the opening 9 into the chamber 1. The electrodes 11 likewise are disposed in spaced relation to the adjacent side walls of the chamber 11 so that a layer of molten glass will be disposed between each electrode and the adjacent wall of the chamber 1. The sealing material between the terminals 10 and the walls of the openings 9 may be glass which has passed into the openings 9 when in a molten state and has "frozen" in the openings so as to seal the spaces between the terminals and the surrounding portions of the walls of the furnace. The electrodes 11 preferably are made of graphite or carbon. The terminals 10 preferably are made of a suitable metal such as iron, although they may be carbon or other suitable material. Such terminals preferably are locally cooled as by providing each terminal with a central bore, such as that shown at 12 in Fig. 5, and circulating a cooling fluid, such as water, through the bore, as by means of the supply pipe 13, Figs. 1 and 5, and the drain or escape pipe 14. The pipe 14 may discharge into the enlarged open end of a delivery pipe 15, Fig. 1. The terminals 10 and the electrodes 11 may be detachably connected, as shown in Figs. 1 and 5, to permit convenient installation thereof and replacement of either the terminals or the electrodes.

The electrodes, if made of carbon or graphite, will be lighter than the molten glass within the chamber 1 and I therefore provide refractory abutment or hold-down members 16 for preventing the electrodes from floating to the surface of the molten bath within the chamber 1 without causing any stress on the terminals or on the sealing material between the terminals and the walls of the openings 9.

The use of the electric resistance furnace described so far contemplates the provision of a bath of molten glass 17 in the chamber 1 so that the electrodes will be continuously submerged and protected by the molten glass against oxidation.

The molten bath may be provided in starting the operation of the furnace in any convenient manner, as by delivering into the furnace from any available source of supply, molten glass sufficient to fill the furnace substantially to the level shown in Figs. 1 and 2. If molten glass is not available for this purpose, glass making material may be melted in the furnace by the local application of heat from any suitable source, as by means of an electric arc or by the use of burners. After the desired level of molten glass has been established in the furnace, it may be regulated or maintained continuously by the electrothermal melting of glass making batch from the heaps 18 at a rate predetermined with respect to the rate at which molten glass is removed from or delivered by the furnace. The heaps 18 may be provided by feeding glass making materials into the melting and refining chamber through the feed openings 19 in the top of the melting and refining chamber. The feed openings 19 may have funnel members 20 at their upper ends into which batch is discharged from the hoppers 21 so that batch fed through the openings 19 will accumulate in heaps which have substantially the shape shown, and which are kept partly submerged and are continuously replenished by the oncoming batch. Preferably the batch is preheated, as by means to be presently described, to facilitate the submergence in the molten glass of the lower portion of each batch heap. While the form of furnace shown in Figs. 1 to 3 inclusive has provision for the feeding of two batch heaps disposed side by side longitudinally of the melting and refining chamber and such batch heaps are merged into each at the vertical median line of the melting and refining chamber, it is obvious that a greater number of batch heaps may be provided or that the batch may be fed into the melting and refining chamber through a single central opening in the top of the melting and refining chamber. In any event, it is desired that the edges of the batch heap or heaps at the surface of the molten bath shall terminate short of the vertical walls of the chamber 1 or that relatively little batch shall cover the molten bath at the edge of the latter. Bubbles or gases resulting from the melting of batch from the submerged portions of the heaps and from the refining of the glass below the melting zone thus are permitted to escape freely from the molten bath adjacent to the edge of the latter. Suitable openings such as indicated at 22 in Figs. 1 and 2 may be provided in the top of the melting and refining chamber to permit the escape of such gases from the latter.

It also is desired that the batch heaps shall be maintained continuously at substantial distances from the electrodes. This desirable condition will be fulfilled by feeding batch through the openings 19 so that upper end portions of the batch heaps will extend into the openings 19 and will be prevented by reason of their contact therewith from moving horizontally in the molten glass while the submerged portions of the batch heaps will be of substantially inverted conical or tapering shape and thus will recede toward their lower ends from the adjacent faces of the electrodes.

It is important that the contact surfaces of the electrodes shall not be overheated when a sufficient electro-thermal heat is developed by the passage of current between the electrodes to provide rapid and thorough heating of the glass bath, melting of the submerged portion of the glass batch, and refining of the glass below the melting zone. To this end, the areas of the contact surfaces of the electrodes are predetermined with relation to the cross-sectional area of the molten glass between the electrodes and with relation to the heat that is to be developed for the desired melting and refining operations so that the heat which will be generated at the contact surfaces of the electrodes will not be substantially greater and preferably will be less than the heat developed at the cross-section of the molten glass when the batch heap depends between the electrodes. The electrodes therefore are of such shape and size that the contact surfaces thereof are not substantially less in area than the area of a cross-section through the intervening molten bath. Consequently, a relatively low current density may be maintained at the contact surfaces of the electrodes without objectionably limiting the development of electrically generated heat for satisfactorily rapid and efficient glass melting and refining operations in the furnace. In prior devices in which relatively smaller electrodes have been employed, it has been found that harmful and objectionable reaction between the electrodes and the molten glass occurs because of overheating of the electrodes, probably because the path for the flow of electric current at the contact surfaces of such electrodes is relatively small in cross section as compared with the cross-section of the remainder of the path for the current through the molten glass and a relatively greater amount of heat thus has been generated at the contact surfaces of the electrodes than elsewhere in the path.

The heap of batch fed to the molten bath depends a considerable distance between the electrodes, as best seen in Fig. 1, and serves to reduce the cross-section of the path through the molten bath for the current between the electrodes intermediately of such electrodes. Since the submerged batch, even though partly melted, has a specific resistance much higher than that of the molten glass, relatively more heat may be generated by the passage of the current next to the submerged batch or in other words at the place where a relatively great amount of electrical energy is to be consumed for the rapid and thorough melting of the batch. A control for the generation of heat at different levels between the electrodes may be provided by predetermining the angular relation of the contact surfaces of the electrodes with respect to each other. These contact surfaces may diverge toward their lower ends as indicated at A in Fig. 1 so that the distance of the path for electric current between the electrodes varies at different levels and with the specific resistance of the intervening glass. This variation may be predetermined so that there will be sufficient increase in the total resistance at different levels to compensate for the decreased specific resistance toward the lower part of the refining zone, which condition would tend to produce a uniform generation of heat at the different levels between the electrodes or, the angular relation of the contact surface of the electrodes with respect to each other may be otherwise predetermined so as to produce any desired variation of generated heat at different levels between different portions of the electrodes. The melting of the glass and refining thereof thus can be accurately predetermined.

While a relatively greater amount of heat may be generated in the melting zone close to the submerged portion of the batch heap because of the higher specific resistance of the materials at that place, more heat will be utilized and absorbed at that place in the melting of the batch. The passage 2 communicates with the lower portion of the melting and refining chamber below the level of the lower edges of the electrodes and the lower edges of the electrodes are located at a level substantially spaced above the floor of the melting and refining chamber so that glass may flow from the refining zone downwardly and then from the refining zone through the passage 2 without excessive heating of the floor of the melting and refining zone. Moreover, the glass in the refining zone may be heated to the required temperature by current passing between the electrodes without causing excessive heating or wear on the bottom of the refining and melting chamber or on the walls of the passage 2.

The glass passing from the refining and melting chamber through the passage 2 will enter the conditioning chamber 3 at the bottom of the latter and may move horizontally along the latter to the forehearth 4. This arrangement permits cooling of the glass to the required temperature during its movement through the conditioning chamber 3 to the forehearth should the glass be relatively hot at the time it enters the conditioning chamber. Further refining of the glass may take place in the conditioning chamber. The horizontal flow of the glass in the conditioning chamber provides a relatively large surface area of glass through which any bubbles or gases remaining in the glass may escape therefrom. Electrodes 23 may be arranged at the opposite ends of the conditioning chamber so as to be submerged by the glass therein and so as to be held against floating to the surface of the glass, as by means of the stops 24. Electrical current may be passed between the electrodes 23 to heat the glass therein as required and to regulate the heat of the glass in the conditioning chamber. The temperature within the conditioning chamber may advantageously be regulated further by providing a burner (not shown) therein so that the surface of the glass may be heated directly by flame from the burner and thus kept relatively liquid to permit ready escape of gas or bubbles from the glass.

In Fig. 3, one form of wiring arrangement suitable for supplying electric current to the electrodes is shown. Such wiring arrangement may include the lead wires 25 and 26 which are connected with any suitable source of electric current, preferably single phase alternating current when electrodes arranged as shown in Figs. 1 to 3 inclusive are employed. The lead wires 25 and 26 are connected by the wires 27 and 28, respectively, with the primary of an adjustable transformer 29. The secondary of such transformer is connected by the wires 30 and 31 with the respective electrodes 11. A switch 32 is provided for controlling the flow of current from the wires 25 and 26 to the wires 27 and 28 and when such switch is closed, electric current will flow between the electrodes 11. The lead wires 25 and 26 similarly may be connected by wires 32 and 33 respectively with the primary of an adjustable transformer 34. The secondary of such transformer is connected by the wires 35 and 36 with the respective electrodes 23 and a switch 37 is provided for controlling the flow of current from the lead wires 25 and 26 to the wires 32 and 33. When the switch 37 is closed, electric current flows between the electrodes 23. Wires 38 and 39, controlled by the switch 40, connect the lead wires 25 and 26 with the primary of an adjustable transformer 41. The secondary of such transformer is connected by the wire 42 with the electrode 23 that is next to the passage 2 and by a wire 43 with one of the electrodes 11. When the switch 40 is closed, electric current flows between one of the electrodes 23 and one of the electrodes 11 through the communicating passage or throat 2 between the refining and conditioning chambers and thus provides a means for regulating the temperature of the glass in the communicating throat or passage.

The electrodes 11 hereinbefore described are relatively large. When such electrodes are made of carbon or graphite, they may conveniently be formed of a plurality of individual strips or sections 44 connected and secured firmly together by transverse connecting rods or dowels 45 as shown for the modified form of electrode indicated at 11a in Figs. 4 and 5 of the drawings. A plurality of terminals 10 may be provided for the electrodes in the melting and refining chamber as indicated in conjunction with the electrodes 11a in Fig. 4 instead of a single terminal for each electrode as shown in Fig. 3. It of course will be understood that each of such terminals will be cooled in the manner hereinbefore described and that all the terminals for each electrode will be suitably connected with the same wire 30 or 31.

In Figs. 6 and 7, I show an electric resistance furnace adapted for the use of three-phase alternating current and comprising structural details somewhat different from those hereinbefore described. The furnace shown in Figs. 6 and 7 comprises a vertically disposed melting and refining chamber 50 which is shown as being circular in cross-sectional configuration, but which may be rectangular, hexagonal, or of any other desirable configuration. The melting and refining chamber 50 is connected at its lower end by a submerged passage or throat 51 with the bottom portion of a conditioning chamber 52. The conditioning chamber 52 is shown as being provided adjacent to its outer end with means, indicated at 53, for drawing glass upwardly in sheet form. A bridge 54 is shown as extending transversely of the conditioning chamber between the glass drawing means and the intake end of the conditioning chamber, such bridge being provided with a longitudinal bore 55 through which a cooling fluid may be circulated. It will be understood that the glass drawing means 53 may be omitted and that a forehearth may be associated with the conditioning chamber 52 substantially in the same manner as for the form of furnace shown in Figs. 1 to 3 inclusive or that any other suitable known means may be provided for taking out or delivering glass from the tempering chamber. The walls of the melting and refining chamber, the communicating passage 51 and the conditioning chamber 52 may be of any suitable refractory material and may be suitably reinforced, encased, insulated and supported.

A plurality of electrodes 56, shown as three in number, are symmetrically disposed around the inner wall of the melting and refining chamber 50 below the level of the bath of molten glass 57 in the latter. Each of the electrodes 56 preferably is of substantially triangular shape in horizontal sectional configuration as shown in Fig. 6 and also may have a downwardly and outwardly inclined contact surface indicated at 58 in Fig. 7 so that such electrode may be said to be substantially triangular in vertical sectional configuration as well as in horizontal sectional configuration. The contact surfaces of the electrodes thus are divergent toward their lower ends and also toward their outer side edges. Each electrode 56 has a terminal 59 which extends through a suitable opening in the side wall of the melting and refining chamber. Each terminal 59 may be substantially identical in structural details with the hereinbefore described terminal 10. The electrodes 56 are spaced from the adjacent portions of the wall of the melting and refining chamber by a layer of the molten glass to protect such electrodes from oxidation by any air which may penetrate the walls of the melting and refining chamber and preferably a sufficient space is provided between each terminal 59 and the opening in the wall of the melting and refining chamber through which such terminal extends for the entrance of sufficient molten glass to provide an adequate seal against the ingress of air around the terminal. The electrodes, being lighter than the molten glass, are held down by the upper abutment or hold-down blocks 60 and may rest on lower supporting blocks 61, Fig. 7.

The top of the melting and refining chamber may be provided with a single central feed opening 62 from which an annular lip 63 may depend a considerable distance into the space above the molten glass 57. Insulation, such as indicated at 64 may be provided on the top member of the melting and refining chamber between the latter and a cover plate 65. Preheating and feeding means for the batch may comprise a rotary supporting frame 66 which carries wheels 67 resting on and in rolling contact with an annular track 68 that is concentric with the feed opening 62. The frame 66 carries depending batch spreading and feeding blades 69 which serve to distribute batch on the plate 65 and to gradually feed such batch inwardly to and through the central opening 70 in the plate 65 and the feed opening 62. The central opening 70 registers with the feed opening 62. The rotation of the frame 66 on the track and about the axial line of the feed opening 62 may be effected by providing upwardly turned gear teeth 71 on the frame in mesh with a pinion 72 that is carried by a shaft 73. The shaft 73 may be supported in bearing 74 on stationary frame 75 at the top of the melting and refining chamber and may be rotated in any suitable manner, being shown as provided with a pulley 76 to which power may be applied. Batch is fed from a hopper 77 to the space between the frame 66 and the plate 65 adjacent to the outer edge of the latter. The hopper discharges onto a stationary plate 78. The rotating frame 66 carries a wiper member 79 which wipes across the plate 78 at each rotation of the frame 66 and sweeps batch from the plate 78 so that such batch will fall through an open portion 80 of the frame 66 onto the plate 65 adjacent to the outer edge of the latter. As hereinbefore stated, the batch fed onto the plate 65 is spread over the surface of the latter during the inward movement of the batch toward the feed opening at the center of the plate and is preheated by heat and gases from the interior of the furnace so as to become quite dry. This is desirable for efficient feeding of the batch into the glass and for the reason that dry glass making materials will sink more readily into the molten bath and it is intended that the downward feed of batch shall cause a considerable portion of the batch heap, indicated at 81 in Figs. 6 and 7, to be submerged in the molten bath centrally of the contact faces of the electrodes. Such batch heap preferably does not extend to the outer edge of the bath in the melting and refining chamber and escape of gases at the surface of the molten bath thus is permitted. The portion of the batch heap above the surface of the glass will contact with the depending lip 63 and will be prevented against floating horizontally from a central position in the melting and refining chamber. The rotary frame 66 carries a finger 100 which depends into the feed opening 62 close to the inner wall of the latter and prevents caking of the batch to the inner wall of the feed opening and obstruction of feed through such opening.

The terminals of the electrodes as shown in the melting and refining chamber of the furnace construction of Figs. 6 and 7 may be connected in any suitable manner, which need not be described or illustrated, with any suitable source of electric current supply. Such terminals and the electrodes in the melting and refining chamber are well adapted for connection with a source of three-phase alternating current. It of course is desired that the current supplied to the electrodes may be adjusted, as by the use of adjustable transformers.

The electrodes 56 are of such shape and size as to provide contact surfaces which are relatively large and are not substantially less than the area of a vertical section through the intervening body of molten glass between each two electrodes. Also, the downward divergence of the contact faces of the electrodes serves to increase the total resistance to the flow of electric current therebetween at different levels as the glass becomes hotter and has less specific resistance at different levels, thus providing a control of the generation and distribution of heat at different levels.

The conditioning chamber 52 may be provided with cooperative electrodes 82 submerged in the glass at opposite ends of the conditioning chamber and provided with terminals 83 which may be connected with any suitable source of supply of an electric current so that the electric current may be passed between the electrodes 82 longitudinally of the glass in the conditioning chamber and the temperature of the latter thus regulated. It also will be understood that the adjacent electrode 82 may be suitably connected electrically with one or more of the electrodes 56 in the manner similar to that illustrated in Fig. 3 so as to cause flow of an electric current through the submerged throat or passage 51 for regulating the temperature of the glass in such passage.

The electrodes may be formed of a series of partially superposed strips or sections, preferably of graphite, connected by vertical connecting pins or dowels 85 as shown for the built-up or composite form of electrode indicated generally at 86 in Figs. 8, 9 and 10. Such electrode may be generally V-shaped in horizontal section as shown and the arms thereof may be provided with terminals 87 which extend through suitable openings in the walls of the melting and refining chamber. The terminals 87 may be genally similar and protected and cooled in substantially the same manner as the hereinbefore described terminals 10. The electrodes 86 may have portions extending between the abutments or shoulders 88 and 89, respectively, of the melting and refining chamber 50 as shown in Figs. 9 and 10 to prevent such electrodes from floating to the surface of the molten glass.

In lieu of a single feed opening such as indicated at 62 in Fig. 7 and as hereinbefore described, the top of the melting and refining chamber, indicated at 50a in Fig. 11, may be provided with a plurality of feed openings, such as indicated diagrammatically at 90, so that a batch heap 91 may be fed separately to the molten bath midway between each two adjacent electrodes within the melting and refining chamber. The construction shown in Fig. 11 is such as to provide three batch heaps 91 which merge together more or less at the center of the melting and refining chamber but which have their vertical median lines located in intersecting relation to straight lines between the adjacent electrodes 56. The chamber 50a may be provided with a plurality of symmetrically spaced passages 51a. Each of the latter is similar to the hereinbefore described passage 51 and may conduct molten glass from the bottom of the melting and refining chamber to the lower part of an individual tempering chamber (not shown) which may be similar to either the tempering chamber 3 or the tempering chamber 52.

While I have shown and described specific constructions as exemplifying structural features of the invention and as being adapted for use in the performance of methods embodying the invention, it is to be understood that the invention is not limited to such specific constructions, but that various features of the invention may be modified as to structure, combination, and arrangement to adapt the invention to different uses or different conditions of service.

While the invention has been described as particularly adapted for use in the melting and refining of glass, such invention may be used for the melting, refining, or heating of soluble sodium silicate (water-glass) or of various other similar materials which will serve as a resistance to the flow of electric current therethrough. The term "glass" as used in claims of this application is intended to apply also to other similar materials.

I claim as my invention:

1. An electric resistance glass making furnace in which molten glass serves as a resistance to the flow of an electric current, comprising a chamber adapted for the reception of a bath of molten glass, said chamber having an inlet above the level of said bath through which glass making materials may be fed to said bath and having an outlet at a lower level submerged by the molten glass, and spaced electrodes totally submerged by the molten glass in said chamber and disposed above the level of said outlet.

2. An electric resistance glass making furnace in which molten glass serves as a resistance to the flow of an electric current, comprising a chamber containing a bath of molten glass, means for feeding glass making materials to the upper part of the bath, means for conducting molten glass from the lower part of the bath, and spaced electrodes totally submerged in said bath and spaced above the bottom of said chamber.

3. An electric resistance glass making furnace in which a bath of molten glass serves as a resistance to the flow of an electric current, comprising a chamber containing said bath, spaced electrodes totally submerged by the bath, means for feeding glass making materials to said bath in a mass that is forced partially below the surface of the bath between portions of said spaced electrodes, and means for conducting molten glass from said chamber at a level spaced below the lower edges of said electrodes.

4. An electric resistance glass making furnace in which molten glass serves as a resistance to the flow of an electric current, comprising a vertically disposed glass melting and refining chamber containing a bath of molten glass, horizontally spaced electrodes totally submerged by the bath, means for feeding glass making materials to said bath in a heap extending downward into the bath between the upper portions of said electrodes, and means for conducting molten glass from said chamber at a level spaced below said electrodes, whereby molten glass will move vertically in the chamber during refining thereof.

5. In an electric resistance glass making furnace, a chamber containing molten glass, spaced electrodes of graphite totally submerged in the glass in said chamber, said electrodes having contact surfaces of relatively large area as compared with the cross sectional area of the molten glass between such electrodes and being spaced from the walls of the chamber by layers of glass, metallic terminals for said electrodes extending through openings in the walls of said chamber below the level of the glass in the chamber and being of relatively small area in cross section, layers of glass sealing said openings around the terminals and spacing said terminals from the walls of the openings, and means for cooling said terminals.

6. In an electric resistance glass making furnace, a chamber containing molten glass, spaced electrodes totally submerged in the glass in said chamber in spaced relation with the walls of the furnace, said electrodes being lighter than the molten glass, and hold-down means for the electrodes.

7. In an electric resistance glass making furnace in which molten glass serves as a resistance to the flow of an electric current, fixed electrodes for passing an electric current through the molten glass, said electrodes being shaped and relatively arranged to provide different lengths for the resistance paths at different levels between the electrodes to cause a differential generation of electro-thermal heat at different levels in the glass.

8. In an electric resistance glass making furnace, a chamber containing molten glass, and spaced fixed electrodes submerged in the glass and shaped to provide inclined surfaces in contact with the glass and relatively arranged to control the total resistance to the flow of electric current at different levels between said electrodes with relation to the specific resistance of the materials intervening between the electrodes at such levels.

9. An electric resistance glass making furnace comprising a chamber containing molten glass, means for feeding glass making batch into said chamber in a heap that extends below the surface of said bath, spaced electrodes submerged in the glass in said chamber and extending both above and below the lower end of the submerged portion of said batch heap, said electrodes having contact surfaces of sufficient area with relation to the cross section of the intervening glass to prevent overheating of said electrodes, said electrodes having their contact surfaces diverging toward their lower ends as the specific resistance of the intervening material decreases.

10. In an electric resistance glass making furnace, a chamber containing molten glass and having vertically spaced glass melting and glass refining zones, a passage for the removal of the refined glass communicating with the lower portion of the refining zone, means for passing an electric current through the glass in said chamber along a substantially horizontal path of relatively large cross sectional area and located partly in the melting zone and partly in the refining zone, and means for feeding glass making batch to the glass and between the electrodes so as to increase the specific resistance to the flow of part of the current through the glass in the melting zone.

11. An electric resistance glass making furnace comprising a chamber containing molten glass, a plurality of electrodes submerged in the glass and spaced symmetrically about the vertical center line of said chamber, said electrodes being adapted for the use of polyphase alternating current and having their contact surfaces formed to diverge toward the lower ends of the electrodes, and means for feeding glass making batch into the molten glass centrally of said electrodes and out of contact therewith.

12. An electric resistance glass making furnace comprising a chamber containing molten glass, a plurality of electrodes submerged in the glass and spaced symmetrically about the vertical center line of said chamber, said electrodes being adapted for the use of polyphase alternating current and having their contact surfaces formed to diverge toward the lower ends of the electrodes, and means for feeding glass making batch into the molten glass centrally of said electrodes and out of contact therewith, each of said electrodes having side portions of the contact surface thereof diverging from the inner face of the electrode.

13. An electric glass resistance furnace comprising a chamber containing a bath of molten glass, a plurality of electrodes submerged in the molten glass and spaced symmetrically around the interior of said chamber, and means for feeding glass making batch to said bath in a plurality of heaps, each of said heaps having its vertical median line disposed in intersecting relation to a straight path for electric current between two of said electrodes.

14. In a glass melting furnace, a chamber containing molten glass, means for heating said glass, and means for feeding glass making batch to said molten glass and for preheating said batch, said last named means comprising a drying plate at the top of said chamber, said plate having a feed opening and being adapted to be heated by heat from the interior of the chamber, means for delivering glass making materials to the drying plate adjacent to the outer edge of the latter, a supporting member rotating about the axial line of said feed opening and means carried by said rotary supporting member for spreading the glass making materials on the drying plate to facilitate the drying thereof and for feeding the dried materials through said feed opening.

15. In a glass melting furnace, a melting chamber having an inlet at its top, means for feeding glass making batch through said inlet into said chamber, and a movable scraper member depending into said inlet for preventing said glass making batch from adhering to said inlet.

16. The method of making glass which comprises providing a bath of molten glass, passing an electric current through the bath between electrodes submerged in the bath, feeding glass making batch to said bath in a mass that is forced partially below the surface of the bath between portions of said electrodes, conducting molten glass from the bath at a level below the lower edges of the electrodes, and predetermining the areas of the contact surfaces of said electrodes with relation to the cross sectional area of the glass between the electrodes to prevent harmful heating of the electrodes when the generation of electric heat in the glass is sufficient for the melting of the incoming batch and refining of the molten glass.

17. An electric furnace adapted for the use of polyphase current, comprising a chamber for molten glass or other similar resistance material, and a plurality of electrodes adapted for connection with a source of polyphase electric current within said chamber and spaced angularly about the vertical central line thereof, each of said electrodes comprising a pair of divergent arms, the arms of each electrode confronting the arms of other of said electrodes.

18. An electric furnace comprising a substantially vertical chamber for molten glass or other resistance material, and three electrode units located within said chamber and spaced symmetrically about the vertical central line of the chamber and adapted for connection with a source of three-phase electric current, each of said electrode units being angular in horizontal cross section, the arms or angularly related members of each electrode unit diverging outwardly and being opposed to arms or members of the other electrode units.

19. An electric furnace comprising a chamber for molten glass or other similar resistance material, a plurality of electrodes located within said chamber and disposed in angularly spaced relation about the vertical central line of the chamber, each adapted for connection with a source of polyphase electric current, and each of said electrodes having side faces opposed to side faces of other of said electrodes, thus providing heating zones between the side faces of adjacent electrodes.

20. An electric furnace comprising a vertical chamber for glass or like resistance material, a plurality of electrodes submerged in the resistance material in the chamber and spaced angularly about the vertical central line of the chamber, each adapted for connection with a source of polyphase electric current, and each of said electrodes having side faces in contact with the resistance material and opposed to side faces of other of the electrodes, whereby the passage of electric current through the resistance material between the opposed faces of adjacent electrodes will provide a plurality of heating zones at places spaced angularly about the vertical central line of the chamber.

21. In a electric resistance furnace, a chamber for glass or similar resistance material, spaced cooperative electrodes, and means for conducting electric current thereto, the electrodes proper being submerged in the material in said chamber, one of said electrodes having a surface in contact with the resistance material inclined from the vertical.

22. In an electric resistance furnace, a chamber for glass or similar resistance material, spaced cooperative electrodes in contact with the material in the chamber and adapted for connection with a source of supply of electric current, one of said electrodes having a contact surface inclined with respect to the vertical and away from another of said electrodes, means for feeding batch to the material in the chamber at a place located between said electrodes.

Signed at Hartford, Connecticut this 13th day of September, 1928.

JOHAN KRISTOFFER BJÖRN RAEDER.